April 24, 1945.  T. C. JACKSON  2,374,207
DUAL ROTATION TEST DRIVE
Filed Nov. 18, 1943   3 Sheets-Sheet 2
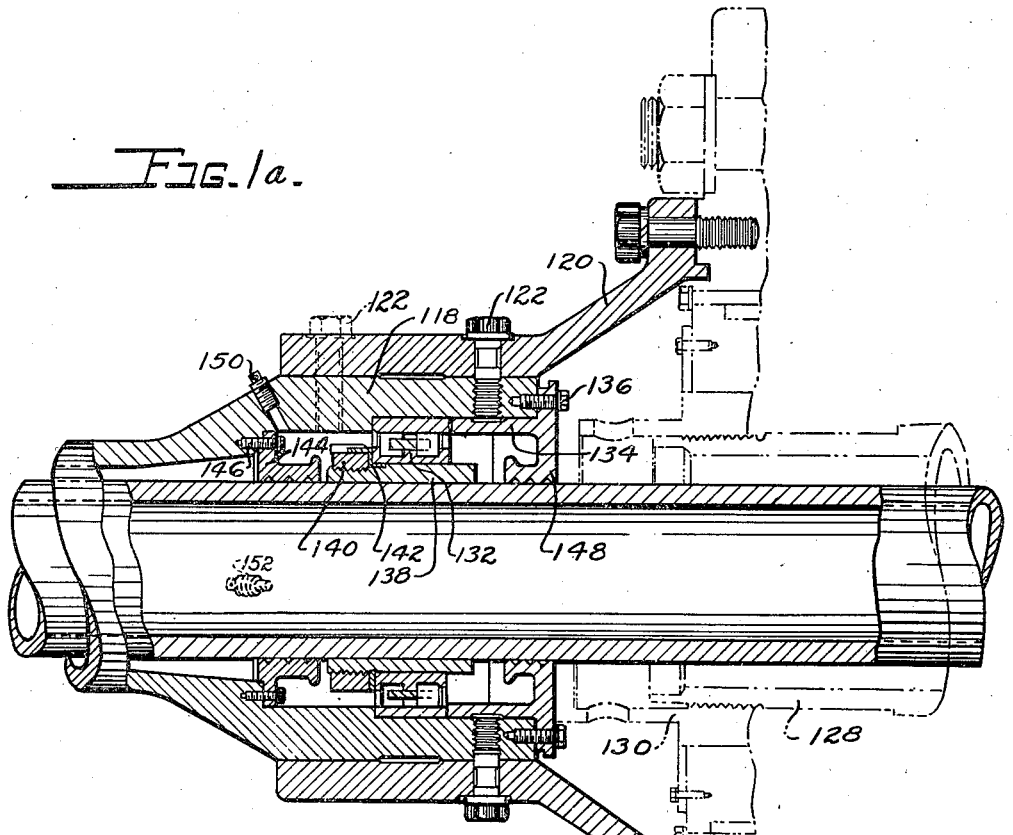
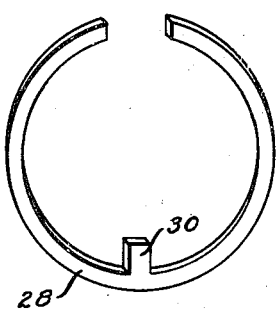
INVENTOR
TOM C. JACKSON

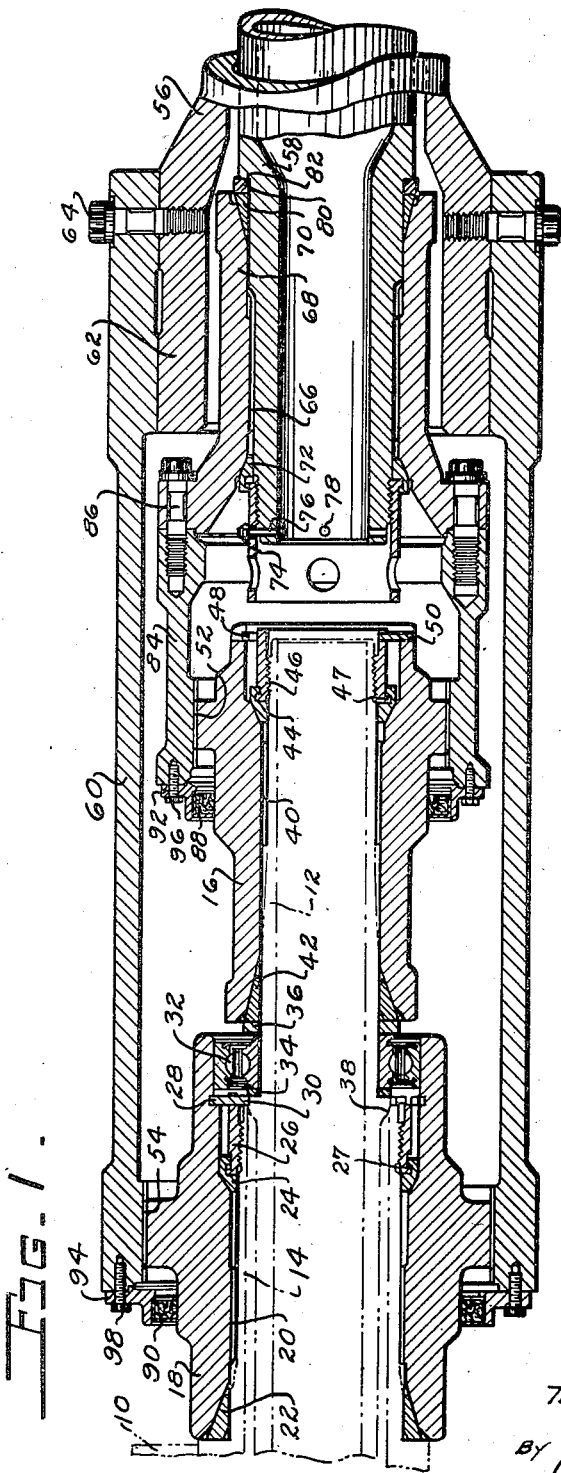

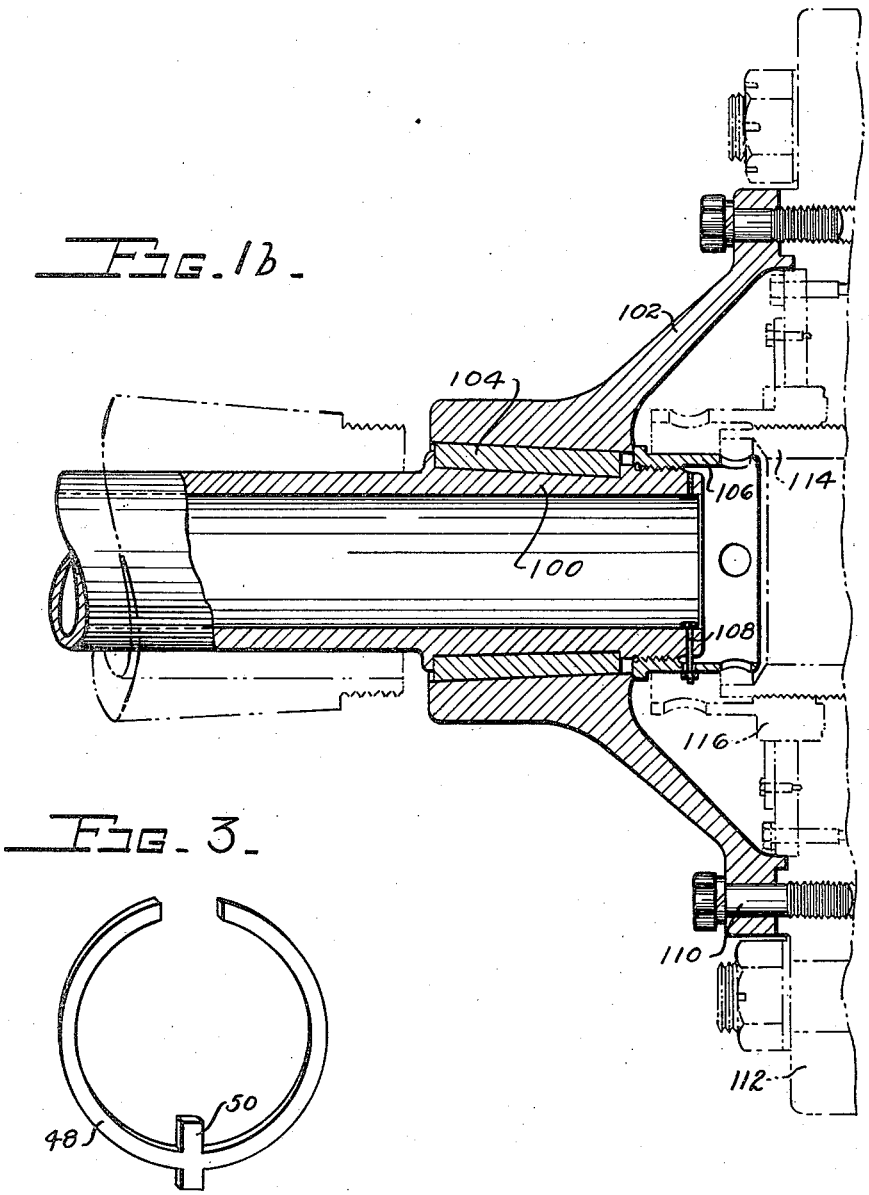

Patented Apr. 24, 1945

2,374,207

UNITED STATES PATENT OFFICE 2,374,207

DUAL-ROTATION TEST DRIVE

Tom C. Jackson, Lebanon, Ky.

Application November 18, 1943, Serial No. 510,791

1 Claim. (Cl. 73—134)

(Granted under the act of March 3, 1883, as amended April 30, 1928; 370 O. G. 757)

The invention described herein may be manufactured and used by or for Government for governmental purposes, without the payment to me of any royalty thereon.

This invention relates to a mechanical device for connecting the two concentric shafts of a dual rotation engine to two dynamometers or similar torque measuring instrumentalities for the purpose of making engine tests, the two dynamometers being in axial alignment with the engine shafts and with each other. The two engine shafts may rotate oppositely or in the same direction.

The objects of this invention are, first, to provide a system which may be adapted to all dual rotation engines and dynamometer designs of the hollow rotor type; second, to provide a direct means of connection between engine and dynamometer which will afford an individual, yet simultaneous calibration of each engine shaft. This system will avoid the use of gear trains or any such mechanism which will introduce loss of power transmitted due to friction and a design which will not present complicated assembly, disassembly and maintenance problems.

This invention, taken collectively or in any of its component parts, is not to be associated with the design or claims of any particular dynamometer or engine arrangement. It is a separate and independent arrangement and is to be considered as a transmission linkage between engines and dynamometers incorporating the principles of dual rotation.

The objects of this invention have been attained by the mechanism illustrated in the accompanying drawings, in which:

Fig. 1, Fig. 1a and Fig. 1b are the three parts of a vertical axial section through a preferred embodiment of the invention as it will appear when assembled and connected for testing an engine having two shafts such as are provided for a dual-rotation propeller; and Figs. 2 and 3 are detail views of two of the locking means employed to maintain proper assembly of some of the parts.

Referring now more particularly to the left or engine end of the drawings, an engine 10 has a relatively long hollow propeller shaft 12 extending laterally, and a second larger but shorter shaft 14 concentrically surrounding the first. The first or longer shaft 12 may be referred to as the outboard shaft, and the second or shorter shaft 14, the inboard shaft. In applying the testing apparatus, which is the subject of this invention, to an engine, the propellers are necessarily for the time omitted from shafts 12 and 14, and are replaced respectively with adapters 16 and 18.

Adapters 16 and 18 have internal contours which are substantially duplicative of the outboard and inboard propeller hubs respectively. Inasmuch, however, as a number of different engines are to be tested by means of the apparatus herein disclosed, resulting in a considerable number of shaft combinations, there must necessarily be a different adapter for each different size of outboard and each different size of inboard shaft.

Adapters 16 and 18 are fitted to the particular shaft combination shown, and are drivably affixed thereto in the same manner as the hubs of the propellers which are subsequently to be attached to the shafts.

The inboard adapter 18 has internal splines 20 fitted to the external splines of shaft 14, and is clamped between a rear cone 22 and a front cone 24 by the clamping nut 26, the nut being locked against rotation relative to the inboard adapter by a split locking ring 28, which carries a key 30 extending radially inward from the ring (see Fig. 2), the key passing through one of a series of slots in the end of the nut 26 into one of a series of slots in the end of the inboard shaft 14.

The split locking ring is sprung into an annular groove in the bore of the adapter 18 to secure it against axial displacement. An anti-friction bearing 32 has its outer race fitted to the bore of the adapter 18 and its inner race fitted to the external diameter of the outboard shaft 12. The inner race of bearing 32 is clamped between spacing washers 34 and 36 against a shoulder portion 38 on the outboard shaft 12.

The outboard adapter 16 has internal splines 40 fitted to the external splines of shaft 12, and is clamped between a rear cone 42 and a front cone 44 by the clamping nut 46, the nut being locked against rotation relative to the adapter 16 by a split locking ring 48 which carries a key 50 extending radially both outward and inward from the ring (see Fig. 3), the inwardly extending portion of the key passing through one of a series of slots in the end of the nut 46, and the outwardly extending portion of the key passing through one of a series of slots in the end of the adapter 16.

The split locking ring is sprung into an annular groove in the bore of the adapter 16 to secure it against axial displacement. Tightening of the nut 46 clamps the inner race of the bearing 32 to the shoulder 38 and at the same time it secures the adapter 16 to the outboard shaft 12. Clamping nuts 26 and 46 are both of the conventional type which are provided externally with annular ribs 27 and 47 which extend into internal annular grooves in the cones, whereby the nuts are capable of withdrawing the front cones 24 and 44 as well as forcing them inward into place.

The extreme outer diameter of the adapters 16 and 18 are provided respectively with splined portions 52 and 54. It is noted that while the inner configuration of the several adapters will vary in accordance with the engine shafts upon which they are to be used, the splined portions 54 of all inboard adapters are identical and the splined portions 52 of all outboard adapters are identical.

Two concentric torque tubes 56 and 58 are provided for transmitting the torque of the inboard and outboard shafts respectively to the front and rear dynamometers. A large sleeve 60 drivably connects the inboard adapter 18 to the outer torque tube 56. The engine end of the sleeve 60 is internally splined to fit slidably over the external splines 54 of the inboard adapter 18, the outer end of the sleeve being of smooth bore adapted to fit slidably over the enlarged end 62 of the outer torque tube 56. Circumferentially spaced screws 64 drivably connect the sleeve 60 and tube 62.

The inner torque tube 58 is reduced in diameter at the engine end, the reduced end being provided externally with splines 66. A flanged hub 68 has internal splines which fit slidably over the splines 66, the hub being clamped between a rear cone 70 and a front cone 72 by the clamp nut 74. A locking bolt 76 is inserted through one of a series of holes 78 in the end of the tube, and through one of a series of somewhat elongated openings in the nut. A spacing collar 80 is clamped between the rear cone 70 and a shoulder 82 on the inner torque tube 58.

A short sleeve 84 is concentrically held on the engine end of the hub by the cap screws 86, the engine end of the sleeve 84 being provided with internal splines which fit slidably over the splines 52 on the outboard adapter 16. Lubricant seals 88 and 90 are held respectively in seal housings 92 and 94 and are secured to the engine ends of the sleeves 84 and 60 by cap screws 96 and 98.

Referring now to the right hand or dynamometer end of the drawings, the inner torque tube 58 is provided with a tapered rear end portion 100 to which the internally tapered hub of the flange 102 is fitted. The hub and the tapered end portion of the shaft are drivably connected by means of keys 104, the hub being pressed into place on the taper by the nut 106. A locking bolt 108 is inserted in one of a series of radial holes in the end of the tube and extended also through one of the series of elongated slots in the nut, whereby the nut is secured in its adjusted position. The flange 102 is held by cap screws 110 to the front face of the rear dynamometer coupling 112, the coupling being fastened on the front end of the hollow shaft 114 of the rear dynamometer rotor by the nut 116.

The rear end of the outer torque tube 56 is enlarged as at 118 and the hub of the flange 120 is slidably fitted thereover. Cap screws 122 drivably connect the enlarged portion 118 and the flange 120. The flange 120 is held by cap screws 124 to the front face of the front dynamometer coupling 126, the coupling being fastened to the front end of the hollow shaft 128 of the front dynamometer rotor by the nut 130.

In order to prevent whip at the mid portion of the inner torque tube 58, an antifriction alignment bearing 132 is mounted with its outer race concentrically held in the enlarged portion 118 of the outer torque tube 56 by a bearing retainer 134 which is held against the outer race by cap screws 136, the inner race being mounted on an externally tapered split sleeve 138 which is drawn by a nut 140 into the tapered bore of the inner race, which coincidentally fixes the inner race to the split sleeve 138 and the split sleeve 138 to the torque tube 58. A lock washer 142 maintains the nut in the adjusted position. An oil retainer 144 is held by cap screws 146 against a shoulder in the bore of the enlarged end 118 of the outer torque tube for retaining the bearing lubricant at the engine end. The bearing retainer 134 has an oil seal portion 148 which seals against escape of bearing lubricant at the dynamometer end. A filler plug 150 is provided for entry of bearing lubricant. An overflow plug 152 is provided and should be removed when filling the bearing space with lubricant.

Preparation for testing an engine arranged for dual-rotation propellers is preferably made as follows:

The rear dynamometer may first be moved backward away from the front dynamometer to afford working room for making necessary connections thereto. Couplings 112 and 126 are attached to the forward ends of the dynamometer rotor shafts 114 and 128 respectively by the nuts 116 and 130.

The inner torque tube 58 is now fed through the hollow rotor shaft 128 of the front dynamometer until its tapered end 100 extends into the space between the two dynamometers. The keys 104 are next put in place and the flange 102 is drawn up on the keys and the taper 100 by the nut 106, the nut being then locked by a bolt 108.

The rear dynamometer may now be moved forward and secured in position on the bed plate, then the flange 102 secured to the rear dynamometer coupling 112 by the cap screws 110.

Split sleeve 138 with its alignment bearing 132, nut 140 and lock washer 142 are now correctly located on the inner torque tube 58 and fastened with the nut 140. The oil retainer 144 is secured in the enlarged rear end 118 of the outer torque tube 56 by means of the cap screws 146. The outer torque tube 56 is then concentrically moved over the inner torque tube 58 from the engine end until the outer race of the bearing 132 is seated in its recess in the enlarged rear end 118. Bearing retainer 134 with its oil seal portion 148 is now fastened in place with the cap screws 136.

Flange 120 is now brought into position over the enlarged end 118 to the dynamometer coupling 126, after which the flange is secured to the enlarged end 118 by means of the cap screws 122 and to the dynamometer coupling by means of the cap screws 124. This will complete the dynamometer end connections.

In making the engine end connections, the spacing collar 80 and rear cone 7 are slipped over the inner torque tube 58 until stopped by the shoulder 82. The cap screws 86 are inserted in the holes in the flanged hub 68 after which the flanged hub 68 is put into place with the internal splines of the hub fitting into the external splines 66 of the inner torque tube. The front cone 72 is then put on and drawn up by the nut 74, the nut being locked with a bolt 76. The short sleeve 84 may now be concentrically secured to the flanged end of the hub 68 by the cap screws 86.

The large sleeve 60 should now be moved completely over the enlarged end 62 of the outer torque tube 56, the smooth bored end of the sleeve, having the radial cap screw holes, going over first. The sleeve 60 may be temporarily left hanging loosely on the outer torque tube 56 preferably near the front end of the flange 120.

The testing apparatus is now ready to be connected to the engine, but before bringing the engine up into position, the adapters which replace the propellers during test should be installed on the engine shafts, the procedure preferably being to slip the oil seal 90 and its housing 94 over the inboard adapter 18, then place over the inboard engine shaft 14, the cone 22, then the inboard adapter 18 with its internal splines 20 in mesh with the external splines of the shaft, then the front cone 24 and nut 26, the nut being drawn up and locked with the special locking ring 28.

The spacing washer 34 and bearing 32 are put on the inboard shaft 12, and since both the inner and the outer races of the bearing are press fitted to their final positions, the bearing should be carefully driven home by applying appropriate force to the inner and outer races coincidentally. The washer 36 and cone 42 are slipped over the outboard engine shaft 12, then the oil seal 88 and its housing 92 slipped over the outboard adapter 16, then the adapter 16 put on with its internal splines 40 meshed with the external splines of the shaft, then the front cone 44 put on and drawn up by the nut 46 and locked with the special locking ring 48.

The engine with its adapters thus assembled thereon may now be moved up into position for final coupling, the external splines 52 of the outboard adapter 16 being entered a predetermined measurable distance into the internal splines in the short sleeve 84 when the engine has reached its correct position. Fastening the oil seal housing 92 by means of the cap screws 96 completes connection of the outboard engine shaft to the rear dynamometer.

Lastly the large sleeve 60 is brought forward from its position on the outer torque tube 56, over the enlarged end 62 until the internal splines in the front end mesh with the external splines 54 on the inboard adapter and the radial holes in the sleeve 60 and in the enlarged end 62 of the outer torque tube 56 are aligned. Drivably connecting the sleeve 60 and the part 62 with the cap screws 64, and fastening the oil seal housing 94 to the front end of the sleeve 60 by means of the cap screws 98 completes the connections for testing the engine. Lubrication of the alignment bearing 132 is accomplished by first removing the overflow plug 152, then placing the oil filler plug 150 on top-center and supplying lubricant until it runs out at the overflow opening.

Having described by invention, I claim:

For connecting a dual rotation engine having coaxial inboard and outboard propeller shafts to a front and a rear dynamometer having rotor shafts in axial alignment with each other and with said propeller shafts, the rotor shaft of the front dynamometer being hollow, the improved connecting apparatus which comprises an outer torque tube having its rearward end adapted for drivable attachment to the hollow shaft of the front dynamometer and its forward end adapted to be in a position near the outer end of the outboard propeller shaft, an inner torque tube having its rearward end adapted for drivable attachment to the shaft of the rear dynamometer, its mid portion adapted to extend through the hollow shaft of the front dynamometer and its forward end extending through the forward end of the outer torque tube, an antifriction bearing assembly concentrically supported on the inner torque tube and in the outer torque tube at the forward end of the front dynamometer shaft, an outer connecting sleeve having its rearward end drivably connected to the forward end of the outer torque tube and its forward end adapted to concentrically surround the inboard propeller shaft, an inner connecting sleeve having its rearward end drivably connected to the forward end of the inner torque tube and its forward end adapted to concentrically surround the outboard propeller shaft, said outer connecting sleeve being internally splined at the forward end, an outboard adapter externally and internally shaped to respectively make driving connection between the inner connecting sleeve and the outboard propeller shaft, and an inboard adapter externally splined and internally shaped to respectively make driving connection between the outer connecting sleeve and the inboard propeller shaft, and driving means between the forward end of the outer torque tube and the rearward end of the outer connecting sleeve being removable from the outside, whereby the outer connecting sleeve is axially slidable to uncover the inner connecting sleeve.

TOM C. JACKSON.